United States Patent [19]

Halling

[11] Patent Number: 4,759,555
[45] Date of Patent: Jul. 26, 1988

[54] SPLIT RING SEAL WITH SLIP JOINT

[75] Inventor: Horace P. Halling, Laurel, Md.

[73] Assignee: EG&G Pressure Science, Inc., Beltsville, Md.

[21] Appl. No.: 97,392

[22] Filed: Sep. 16, 1987

Related U.S. Application Data

[63] Continuation of Ser. No. 758,739, Jul. 25, 1985, abandoned.

[51] Int. Cl.$^4$ .............................. F16J 9/18; F16J 15/08
[52] U.S. Cl. .................................. 277/200; 277/206 R; 277/199; 277/218; 277/220; 277/236; 285/397; 285/334.1
[58] Field of Search ............... 277/218, 219, 220, 199, 277/205, 206 R, 236, 235 R, 200; 285/397, 334.1, 334.3

[56] References Cited

U.S. PATENT DOCUMENTS

| | | | |
|---|---|---|---|
| 1,005,153 | 10/1911 | Case | 285/397 X |
| 2,409,283 | 10/1946 | Hudson | 285/399 X |
| 3,245,693 | 4/1966 | Way | 277/222 |
| 3,313,553 | 4/1967 | Gastireau | 277/229 |
| 3,797,836 | 3/1974 | Halling | 277/206 R X |
| 3,857,572 | 12/1974 | Taylor et al. | 277/206 R X |
| 4,218,067 | 8/1980 | Halling | 277/205 |
| 4,477,086 | 10/1984 | Feder et al. | 277/218 X |

FOREIGN PATENT DOCUMENTS

| | | | |
|---|---|---|---|
| 73648 | 8/1917 | Austria | 277/199 |
| 130867 | 1/1985 | European Pat. Off. | 277/26 |
| 610973 | 9/1926 | France . | |

Primary Examiner—Allan M. Shoap
Attorney, Agent, or Firm—Roylance, Abrams, Berdo & Goodman

[57] ABSTRACT

A split ring seal assembly including a split ring seal having a first and a second free end and a connecting member in the shape of a ring segment having first and second ends. The split ring seal and the connecting element have mating E-shaped transverse cross sections such that the connecting element fits within the split ring seal. The E-shaped cross section includes a middle arm portion formed by a curved loop and two outer arms formed by sinuous flanges. The first end of the connecting member is fixedly attached to the first end of the split ring seal. The second end of the connecting member is slidably received within the second end of the split ring seal. This enables the split ring assembly to expand and contract relative to its housing groove as it is exposed to varying temperatures and pressures and to compensate for the accumulation of tolerances in the members forming the joint. The connecting element has a thickness less than the thickness of the split ring seal. The first end of the connecting element is attached to the first end of the split ring seal at points along their transverse cross sections which are not highly stressed. In some embodiments, this may be at the free end of one of the outer arms of the "E". In other embodiments, the outer flanges of the "E" may be comprised of a concave curved portion and a continuously formed convex curved portion. A line of reversed curvature is formed between the concave and convex portions. In these embodiments, the points of connection may be located on one of the lines of reverse curvature.

18 Claims, 3 Drawing Sheets

SPLIT RING SEAL WITH SLIP JOINT

This is a continuation of application Ser. No. 758,739, filed July 25, 1985, now abandoned.

FIELD OF THE INVENTION

This invention relates to ring seals for pressurized fluid joints. More particularly, this invention relates to split ring seals which expand and contract with the abutting joint members when subjected to varying temperatures and pressures.

BACKGROUND OF THE INVENTION

Seals of various types and shapes are employed to prevent fluid from escaping from a joint along a fluid flow path or in a fluid container. Joints in the flow path or in a container are of course formed whenever two or more members are brought together to form a continuous conduit or a fluid receptacle. One common type of seals are ring seals which are employed between members along the flow path or comprising a container to seal the gap between the two members, thus preventing fluid from escaping from between the two members. These two members often have grooves formed therein to receive the ring seal.

These ring seals are resilient due to their material and their geometric design, so that the ring seal fills the gap between the adjacent members defining the flow path. The desired result is that the ring seal will firmly abut both members at all points along the seal so that the gap is completely blocked by the ring seal.

Ring seals, while requiring a fairly wide radial dimension in order to achieve the desired flexibility, are sometimes designed to fit in very narrow annular spaces. The combination of this requirement and the accumulation of manufacturing tolerances on seal and groove diameters and widths can result in undesirable compromises and problems. To overcome these problems, split ring seals were developed to provide circumferential flexibility of the ring seals. Because of this circumferential flexibility, these split ring seals can be adjusted to fit in grooves which are only slightly wider than their radial dimension; thus eliminating the effects of seal and groove diameter tolerances. Other advantages of split ring seals are their ability to compensate for the effects of differential thermal expansion between the seal and the members forming the joint (thus avoiding circumferential thermal stresses) and the possibility of "springing" the seal open, so that it can be assembled over components which are larger in diameter than the seal groove (in the same way as piston rings are expandable to slip over the outside diameters of pistons until they can drop or snap into their recessed grooves).

A split ring seal is basically a continuous ring seal which has had a portion removed across a transverse cross section such that the ring seal can be opened at this split. Two free ends are formed by the split.

However, a split ring seal has the disadvantage that if the split ring is expanded such that the free ends are out of contact, a gap is formed between the free ends of the ring seal. Fluid can then escape through the gap. Thus, a simple split ring seal does not provide a complete seal under all pressures and temperatures, as is often desirable.

In response to this problem, split ring seals with slip joints have been developed. In these seals, the split ring seal assembly includes a slip joint formed by the ends of the split ring seal and a slidable element. The slidable element is in the shape of a ring segment having approximately the same curvature as the split ring seal. A first end of the slidable element is fixedly attached to the first free end of the split ring seal. The second end of the slidable element is slidably received within the second free end of the split ring seal. In these split ring seal assemblies, the second end of the slidable element slides within the split ring seal as the split ring seal assembly expands and contracts when subjected to varying temperatures and pressures.

An example of these ring seals is disclosed in U.S. Pat. No. 4,477,086, issued Oct. 16, 1984 to Feder et al. However, the ring seal assemblies disclosed in U.S. Pat. No. 4,477,086 have a number of disadvantages and are still inadequate for a number of reasons. First, this patent discloses that the split ring seal and the slidable element are of the same material and thickness. This design results in a slip joint which is relatively difficult to compress and not as resilient as desired. Also, since the split ring seal and the slidable element are the same thickness, the slidable element is more highly stressed than the ring seal due to the shorter dimensions of the slidable element and is easily compressed beyond its elastic limit. This is undesirable, as it results in relaxation of the joint elements which permits an increase in leakage through the joint which partially offets the advantages of using a slip joint.

Ring seals having an "E" cross section are well known in the art (see for example, U.S. Pat. No. 3,797,836 entitled SEALING RING issued to Horace P. Halling on Mar. 19, 1974 and U.S. Pat. No. 3,857,572 entitled E-RING SEAL ASSEMBLY issued to Dudley D. Taylor et al on Dec. 31, 1974). In many applications, these ring seals having E-shaped cross sections are preferable because they provide a more effective and stronger seal between the members comprising the flow path. Moreover, seals of the E-shaped cross section may be constructed from a relatively thin metal or other material such that the load required to deflect and compress the seal is lower than for ring seals of other shapes. Also, since the fluid pressure can energize the seal between the outer flanges and the middle arm of the E-cross section, the fluids actually help the seal perform its function.

It is apparent that there still exists a need in the art for a ring seal which can expand and contract when subjected to varying pressures and temperatures and to compensate for design tolerances and yet which provides an effective and durable seal to prevent fluid from escaping from the joint. There is a self-evident need for the expansion joint to remain fully elastic and resist creep and relaxation at elevated temperatures; the stresses must also be low enough to avoid problems due to fatigue resulting from the cyclic deflections in the axial direction which the seal is intended to accommodate. This invention addresses these needs in the art, as well as other needs which will become apparent to those skilled in the art once given this disclosure.

SUMMARY OF THE INVENTION

Generally speaking, this invention provides a ring seal comprising a split ring having first and second ends defining a gap, the split ring having a resilient transverse cross section, the material forming the split ring having a thickness T; a connecting element having first and second ends and a resilient transverse cross section having substantially the same configuration as the split ring transverse cross section but smaller, the material forming the connecting element having a thickness T' which is smaller than said thickness T, the connecting element being received in the split ring cross section to span the gap with the first end of the connecting element being located inward of the split ring first end and the second end of the connecting element being located inward of the split ring second end; and a coupling mechanism for rigidly coupling the connecting element first end to the split ring first end, the connecting element second end being slidable relative to the split ring second end.

In some embodiments of this invention, the split ring and the connecting element are metallic and each is comprised of a unitary sheet of metallic material.

In other embodiments of this invention, the split ring and the connecting element have mating E-shaped transverse cross sections. The split ring and the connecting element are designed such that the connecting element fits within the split ring.

In further embodiments of this invention, the transverse cross section of the split ring is comprised of a first portion including at least two curved portions and a second portion spaced from the first portion and the cross section of the connecting element includes mating portions.

In yet other embodiments of this invention, the coupling means are located in the areas of the lowest stress of the cross section of the ring seal and the connecting element. When the ring seal and the connecting element have mating E-shaped transverse cross sections, the coupling means may be located at the end of an outer leg of the "E".

In yet other embodiments of this invention wherein the ring seal and the connecting element have mating E-shaped transverse cross sections, the cross sections may include two outer flanges and a middle loop which forms the middle flange of the "E". The outer flanges may include at least a convex curved portion and a concave curved portion, these portions being continuously formed such that a longitudinal line of reversed curvature is formed between these two portions. The coupling means may be located at the line of reverse curvature.

In further embodiments of this invention, the coupling means is at least two spaced tack welds.

The ring seals according to this invention have many advantages over the prior art ring seals employable in the same environments. The ring seals according to this invention are more resistant to damage since they are free to expand and contract with their environment and since the connecting element is more resilient than the ring seal. This results in the slidable element being subjected to less stress than the ring seal, which is also desirable. In some embodiments, this is accomplished by the slidable element having a thickness less than the thickness of the ring seal.

Moreover, the ring seals according to this invention are stronger and more durable than the prior ring seals. These ring seals are also more effective due to the incorporation of the double "E" cross section. This configuration more completely closes the gap than the prior ring seals with slip joints, thus permitting less leakage through the gap being filled by the ring seal.

DETAILED DESCRIPTION OF THE DRAWINGS

Figure 1:
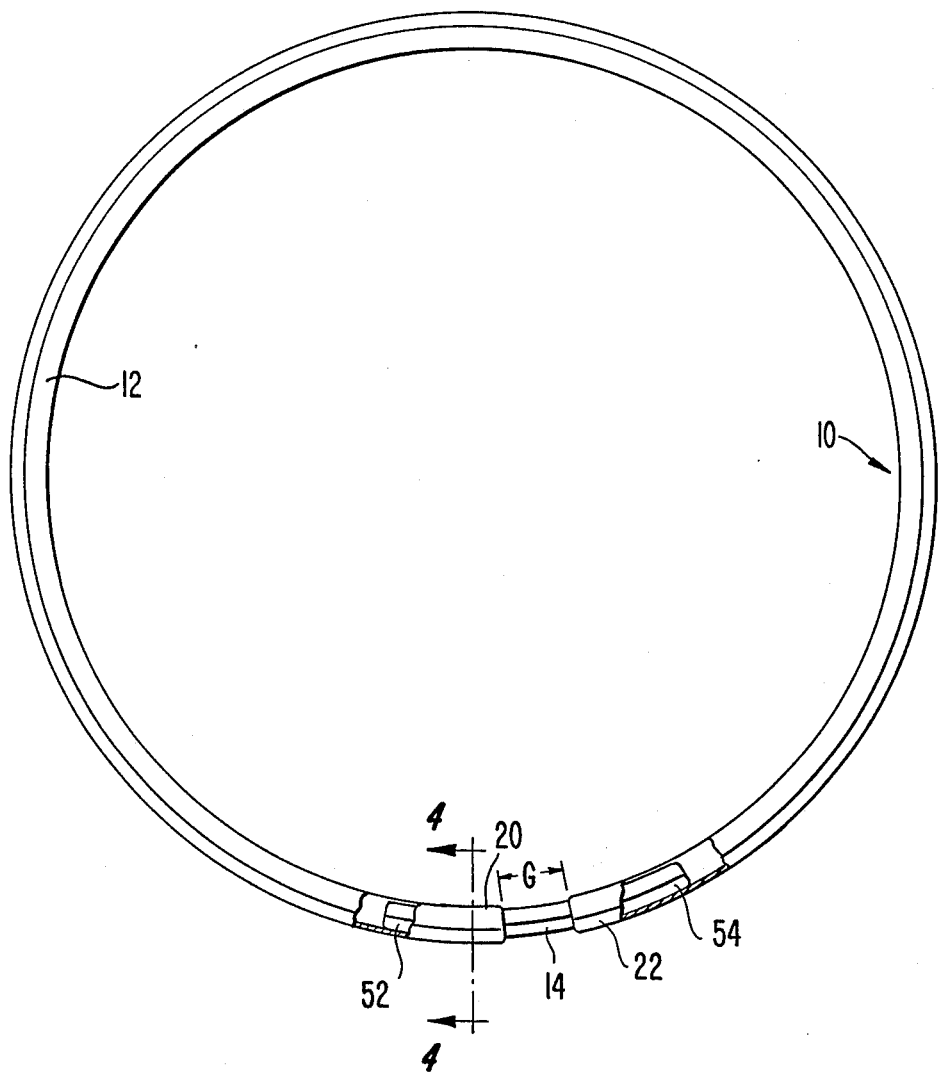
FIG. 1 is a plan view, partially cut away for clarity, of a ring seal assembly according to this invention.
Figure 2:
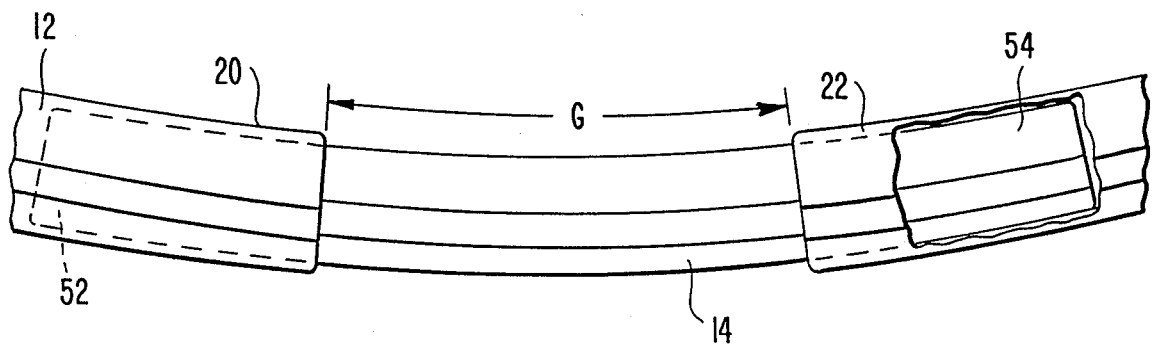
FIG. 2 is an enlarged view of the lower portion of the ring seal assembly illustrated in FIG. 1.

Referring to FIG. 1, a split ring seal assembly 10 with a slip joint is illustrated. Split ring seal assembly 10 includes split ring seal 12, connecting element 14 and tack welds 16 and 18, seen in FIGS. 3 and 4.

Split ring seal 12 is a ring seal having a transverse cross section cut therefrom to form a split ring. Split ring seal 12 has two free ends 20 and 22. A gap G is formed between ends 20 and 22. Split ring seal 12 is formed of resilient material and may be comprised of a sheet of metallic material which has been pressed in the shape illustrated in FIGS. 3-5.

Figure 5:
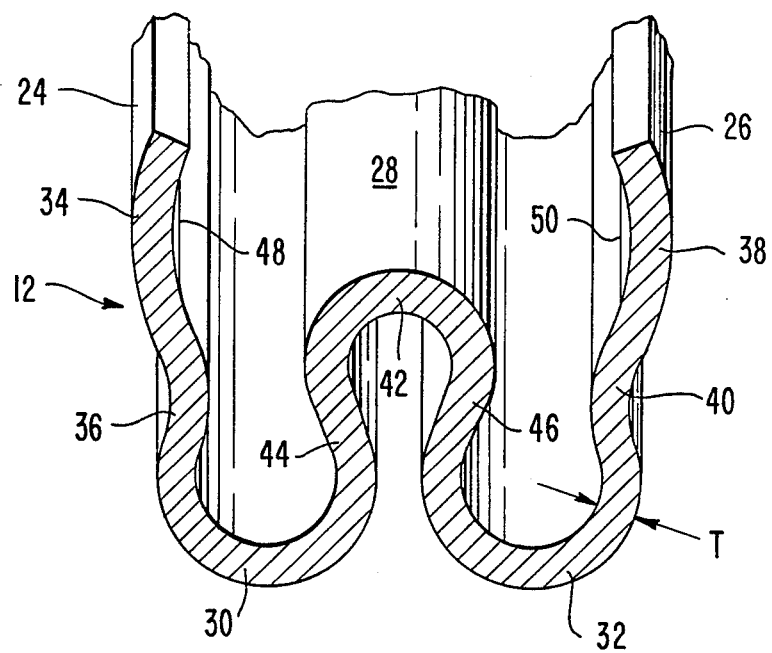
FIG. 5 is a partial cross-sectional view of the split ring illustrated in FIGS. 1-4.

Referring to FIG. 5, a transverse cross section of split ring seal 12 is illustrated. This transverse cross section is E-shaped and includes two outer flanges or arms 24 and 26 comprising the top and bottom flanges of the "E", middle arm 28 forming the middle flange of the "E" and two curved back portions 30 and 32 forming the spine of the "E".

Outer flange 24 is comprised of concave portion 34 and convex portion 36. Likewise, outer flange 26 includes concave portion 38 and convex portion 40. Concave portions 34 and 36 are continuous with convex portions 38 and 40, respectively, forming sinuous legs in the general shape of S-curves. The lowermost ends of convex portions 36 and 40 are connected and continuous with portions 30 and 32, respectively.

Lines of reversed curvature 48 and 50 are formed between the connection of the concave portions 34 and 38 with convex portions 36 and 40, respectively. Lines of reversed curvature 48 and 50 are the lines at which the curvature changes from concave to convex and the reverse.

Middle arm 28 includes an upper curved portion 42 and two straight portions 44 and 46 which extend downward from the ends of upper curved portion 42 and connect on their other ends to back portions 30 and 32, respectively.

Split ring seal 12 has a relatively constant thickness T (see FIG. 5).

Figure 3:
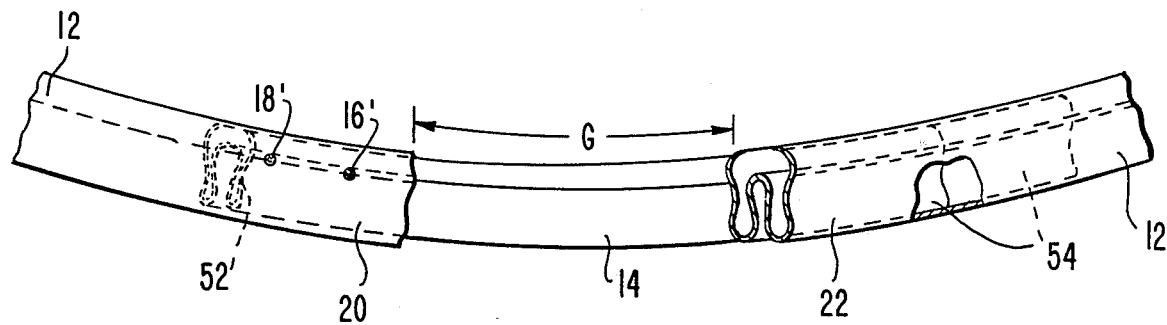
FIG. 3 is a perspective view, partially cut away for clarity, of a portion of the ring seal assembly illustrated in FIGS. 1 and 2.
Figure 4:
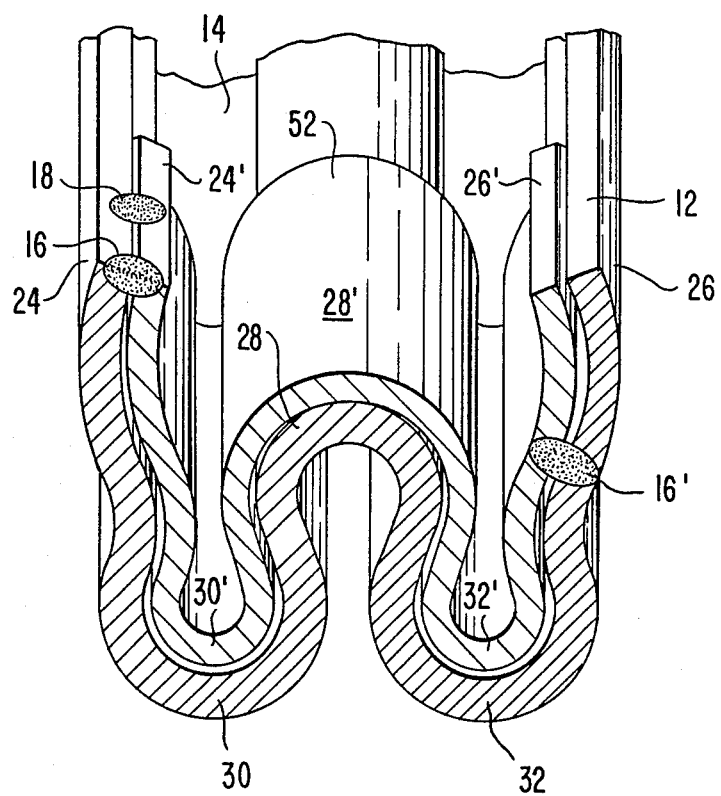
FIG. 4 is a partial cross-sectional view taken along line 4—4 of FIG. 1.
Figure 6:
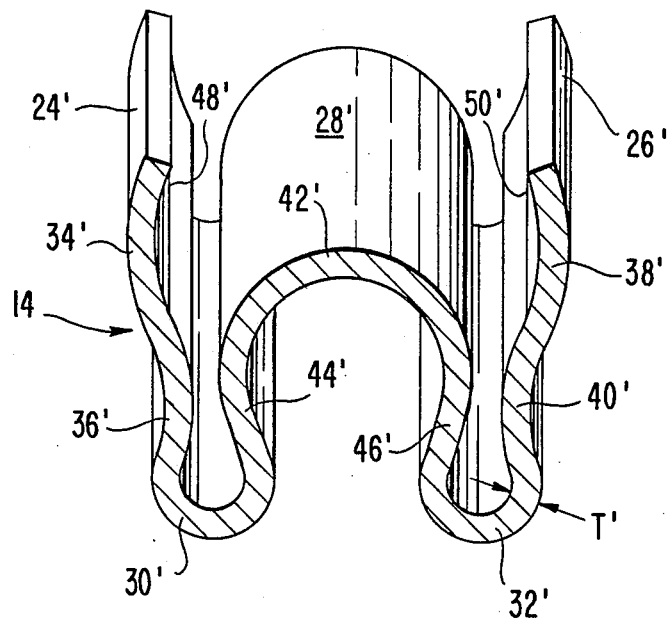
FIG. 6 is a partial cross-sectional view of the connecting element illustrated in FIGS. 1-4.

Connecting element 14 is also comprised of a unitary sheet of resilient, metallic material formed of a cross section illustrated in FIGS. 3, 4 and 6. Connecting element 14 can be of the same material as split ring seal 12 or preferably is made of a material more flexible than the material of which split ring seal 12 is comprised. Connecting element 14 forms a partial ring segment having approximately the same curvature as ring seal 12.

Connecting element 14 has ends 52 and 54. The transverse cross section of connecting element 14 includes the same portions as split ring seal 12 (see FIG. 6). These portions include outer flanges or arms 24' and 26', middle arm 28', back portions 30' and 32', concave portions 34' and 38', convex portions 36' and 40', upper curved portion 42', and straight portions 44' and 46', all of which are complementary to and mate with the corresponding numbered portions of split ring seal 12. Likewise, lines of reverse curvature 48' and 50' are formed by concave portions 34' and 38' and convex portions 36' and 40', respectively.

Connecting element 14 has a thickness T' which is preferably less than the thickness T of split ring seal 12.

Tack welds 16 and 18 rigidly connect end 52 of connecting element 14 to free end 20 of split ring seal 12. Tack welds 16 and 18 are preferably located in the areas of lowest stress in split ring seal 12 and connecting element 14. In the embodiment illustrated in the Figures, these areas are at the bottom end of the outer leg (see welds 16 and 18 in FIG. 4) or along the lines of reverse curvature 48, 48', 50, and 50' (see weld 16' in FIG. 4). Usually, the tack welds will be located in one of these areas, and not both. The tack welds are positioned at areas of low stress to reduce the amount of further stress incurred on the split ring seal and connecting element 14 due to the connection therebetween.

As illustrated in the Figures, end 54 of connecting element 14 is received within the second free end 22 of split ring seal 12. End 54 is free to slide within free end 22 as split ring seal assembly 10 contracts and expands due to varying temperatures and pressures (see the solid and dotted line positions of end 54 in FIG. 3).

Split ring seal assembly 10 is employed by inserting it between two members comprising a fluid flow path. Such elements may be the flanges of two pipes carrying a pressurized fluid, two ring components of a gas turbine engine, etc. The seal is placed between the members and the members are brought together such that the split ring seal 12 and connecting element 14 are compressed. Due to its capability to be "split" open, ring seal 12 can be placed around one or both of the members if necessary. In use, end 54 of connecting element 14 will slide with respect to free end 22 of split ring seal 12 as the seal assembly 10 and the adjoining members contract and expand when subjected to varying temperatures and pressures.

While the above invention has been discussed with particularity to a ring seal and a connecting element having E-shaped cross sections, other cross sections can be employed. Preferably, the cross sections have at least two side members having curved portions.

Advantageously, the split ring and connecting element are formed from a nickel alloy. In a ring having an outer diameter of about 30.370 inches, thickness T of the material forming the split ring is about 0.010 inch±0.001 inch prior to forming and thickness T' of the material forming the connecting element is about 0.007 inch±0.001 inch prior to forming. In this configuration, the gap G is about 0.490–0.530 inch.

Once given the above disclosure, other improvements, modifications and embodiments will become apparent to those skilled in the art. Such other improvements, modifications and embodiments are considered to be within the scope of this invention as defined by the following claims.

What is claimed is:

1. A ring seal comprising:
   a split ring having first and second ends defining a gap,
   said split ring having a compressible, resilient and discontinuous transverse cross section, the material forming said split ring having a substantially uniform thickness T;
   a connecting element having first and second ends and a compressible, resilient and discontinuous transverse cross section having substantially the same configuration as said split ring transverse cross section but smaller, the material forming said connecting element having a substantially uniform thickness T' which is smaller than said thickness T,
   said smaller thickness T' making said connecting element more resilient than said split ring, whereby said connecting element does not exceed its elastic limit before said split ring exceeds its elastic limit when both are subjected to a transverse compressive force,
   said smaller thickness T' reducing the stress on said connecting element, whereby the onset of fatigue from cyclic deflections of said connecting element in an axial direction is delayed,
   said connecting element being received in said split ring cross section to span said gap with said first end of said connecting element being located inward of said split ring first end, and said second end of said connecting element being located inward of said split ring second end; and
   means for rigidly coupling said connecting element first end to said split ring first end, said connecting element second end being freely slidable relative to said split ring second end.

2. A ring seal according to claim 1 wherein said split ring and said connecting element have mating E-shaped transverse cross sections.

3. A ring seal according to claim 2 wherein said split ring and said connecting element are metallic.

4. A ring seal according to claim 2 wherein said split ring and said connecting element are comprised of the same material.

5. A ring seal according to claim 2 wherein said connecting element is comprised of a material more resilient than said split ring.

6. A ring seal according to claim 1 wherein
   the transverse cross section of said split ring is comprised of a first portion having at least two connected curved portions, and a second portion spaced from said first portion,
   the cross section of said connecting element comprising mating portions.

7. A ring seal according to claim 1 wherein said split ring is comprised of a unitary sheet of material.

8. A ring seal according to claim 7 wherein said connecting element is comprised of a unitary sheet of material.

9. A ring seal according to claim 1 wherein said coupling means is located in the areas of the lowest stress of the cross section of said ring seal and said connecting element.

10. A ring seal according to claim 9 wherein said coupling means is at least two spaced tack welds.

11. A ring seal according to claim 1 wherein
    said split ring and said connecting element have mating transverse cross sections,
    said cross sections having two outside flanges and a middle arm forming an "E",
    said middle arm having a free end and being formed by a curved loop,
    said coupling means being located at the free end of said middle arm.

12. A ring seal according to claim 1 wherein said split ring and said connecting elements have mating E-shaped transverse cross sections having two outer flanges and a middle loop, said outer flanges including at least a convex curved portion and a concave curved portion, said portions being continuously formed such that a line of reversed curvature is formed between said portion, said coupling means being located at said line of reversed curvature.

13. A ring seal according to claim 12 wherein said coupling means is at least two spaced tack welds.

14. A ring seal according to claim 1, wherein thickness T' is about 30 percent smaller than thickness T.

15. A ring seal comprising:

a split ring having first and second ends defining a gap, said split ring having a compressible, resilient and discontinuous transverse cross section, the material forming said split ring having a substantially uniform thickness T;

a connecting element having first and second ends and a compressible, resilient and discontinuous transverse cross section having substantially the same configuration as said split ring transverse cross section but smaller, the material forming said connecting element having a substantially uniform thickness T' which is smaller than said thickness T, said smaller thickness T' making said connecting element more resilient than said split ring, whereby said connecting element does not exceed its elastic limit before said split ring exceeds its elastic limit when both are subjected to a transverse compressive force, said smaller thickness T' reducing the stress on said connecting element, whereby the onset of fatigue from cyclic deflections of said connecting element in an axial direction is delayed, said connecting element being received in said split ring cross section to span said gap with said first end of said connecting element being located inward of said split ring first end, and said second end of said connecting element being located inward of said split ring second end; and means for rigidly coupling said connecting element first end to said split ring first end, said connecting element second end being freely slidable relative to said split ring second end;

said split ring and said connecting element having mating transverse E-shaped cross sections, said cross sections including sinuous legs which form the outer arms of the "E", each of said legs having a free end;

said coupling means being located at the free end of one of said legs.

16. A ring seal according to claim 14, wherein thickness T' is about 30 percent smaller than thickness T.

17. A ring seal comprising:

a split ring having first and second ends defining a gap, said split ring having a compressible, resilient and discontinuous transverse cross section, the material forming said split ring having a substantially uniform thickness T;

a connecting element having first and second ends and a compressible, resilient and discontinuous transverse cross section having substantially the same configuration as said split ring transverse cross section but smaller, the material forming said connecting element having a substantially uniform thickness T' which is smaller than said thickness T, said smaller thickness T' making said connecting element more resilient than said split ring, whereby said connecting element does not exceed its elastic limit before said split ring exceeds its elastic limit when both are subjected to a transverse compressive force, said smaller thickness T' reducing the stress on said connecting element, whereby the onset of fatigue from cyclic deflections of said connecting element in an axial direction is delayed, said connecting element being received in said split ring cross section to span said gap with said first end of said connecting element being located inward of said split ring first end, and said second end of said connecting element being located inward of said split ring second end;

said connecting element and said split ring having mating E-shaped transverse cross sections including two outer flanges, said outer flanges having at least a convex curved portion and a concave curved portion, said portions being continuously formed such that lines of reversed curvature are formed between said portions; and means for rigidly coupling said connecting element first end to said split ring first end, said connecting element second end being freely slidable relative to said split ring second end;

said coupling means being located on said lines of reversed curvature.

18. A ring seal according to claim 17, wherein thickness T' is about 30 percent smaller than thickness T.

* * * * *